(12) United States Patent
Lanciault et al.

(10) Patent No.: US 9,147,277 B2
(45) Date of Patent: Sep. 29, 2015

(54) SYSTEMS AND METHODS FOR PORTABLE ANIMATION RIGS

(75) Inventors: Robert Lanciault, St-Ferreol-les-neiges (CA); Simon Ouellet, Vaudreuil-dorion (CA); Sonny Myette, La Presentation (CA)

(73) Assignee: AUTODESK, INC., San Rafael, CA (US)

(*) Notice: Subject to any disclaimer, the term of this patent is extended or adjusted under 35 U.S.C. 154(b) by 461 days.

(21) Appl. No.: 12/914,835

(22) Filed: Oct. 28, 2010

(65) Prior Publication Data

US 2011/0098113 A1  Apr. 28, 2011

Related U.S. Application Data

(60) Provisional application No. 61/255,778, filed on Oct. 28, 2009.

(51) Int. Cl.
*G06T 13/20* (2011.01)
*G06T 13/00* (2011.01)

(52) U.S. Cl.
CPC .............. *G06T 13/20* (2013.01); *G06T 13/00* (2013.01)

(58) Field of Classification Search
USPC .................................. 345/419, 475; 381/306
See application file for complete search history.

(56) References Cited

U.S. PATENT DOCUMENTS

| | | | |
|---|---|---|---|
| 6,426,748 B1 * | 7/2002 | Megahed | 345/419 |
| 2005/0225552 A1 * | 10/2005 | Anand | 345/473 |
| 2005/0253853 A1 * | 11/2005 | Sayre et al. | 345/474 |
| 2008/0117216 A1 * | 5/2008 | Dorie | 345/475 |
| 2010/0303265 A1 * | 12/2010 | Porwal | 381/306 |

* cited by examiner

*Primary Examiner* — Phi Hoang
(74) *Attorney, Agent, or Firm* — Artegis Law Group, LLP

(57) ABSTRACT

One embodiment of the present invention sets forth a technique for transporting both behavior and related geometric information for an animation asset between different animation environments. A common virtual machine specification with a specific instruction set architecture is defined for executing behavioral traits of the animation asset. Each target animation environment implements the instruction set architecture. Because each virtual machine runtime engine implements an identical instruction set architecture, animation behavior can identically reproduced over any arbitrary platform implementing the virtual machine runtime engine. Embodiments of the present invention beneficially enable reuse of animation assets without compatibility restrictions related to platform or application differences.

21 Claims, 9 Drawing Sheets

SYSTEMS AND METHODS FOR PORTABLE ANIMATION RIGS

CROSS-REFERENCE TO RELATED APPLICATIONS

This application claims benefit of U.S. provisional patent application Ser. No. 61/255,778, filed on Oct. 28, 2009, which is hereby incorporated by reference herein.

BACKGROUND OF THE INVENTION

1. Field of the Invention

Embodiments of the present invention relate generally to computer graphics, and, more specifically, to systems and methods for portable animation rigs.

2. Description of the Related Art

Prior art software graphics systems implement modeling, animation, and rendering functions that enable users to create three-dimensional (3D) models, animate the models, and render the models in a 3D graphics scene. Modeling typically involves creating geometric structures that represent a target 3D object. Modeling tools facilitate creating arbitrary shapes that may be moved or deformed according to a specific movement regime. Animation typically involves creating the movement regime for the target 3D object. The movement regime defines relative motion of geometry comprising the target 3D object and may also involve motion within a given graphics scene. For example, the movement regime may define how a humanoid model should implement movement for individual limbs, head movement, and composite movement activities such as walking or laughing. The movement regime may involve certain complex, algorithmically-defined rules governing movement, interdependencies of movement, and constraints placed on the movement.

Animation tools facilitate creating an animation "rig" used to define the movement regime of a target 3D object. The animation rig may include certain standard attributes as well as definitions of complex and algorithmically-defined behavior. Animation tools also facilitate creating animation sequences for the target 3D object based on the movement regime created for the target 3D object. An animation sequence includes a specific set of actions and motion for the target 3D object. One exemplary animation sequence comprises a humanoid model walking. Such an animation sequence includes specific motion curves for each geometric component of the humanoid model. The motion curves are generated in conjunction with an associated animation rig. Once the motion curves are generated for a specific animation sequence, the animation rig is no longer needed to reconstruct that specific sequence. However, generating a different animation sequence would require use of the animation rig to compute respective motion curves.

Rendering typically involves creating one or more frames of image data based on the target 3D object in a particular state of animation. The state of animation is substantially defined by motion curves for the target 3D object. Rendering tools facilitate rendering plural frames of image data corresponding to a particular animation sequence comprising motion curves for one or more target 3D objects.

Modeling, animation, and rendering operations comprise a complete graphics pipeline. In common usage models, different applications are used to perform these operations. For example, one application may implement a modeling tool that is used to create a specific 3D model, a second application may be used to create animation sequences from the 3D model, and a third application may be used to render the animation sequences. In one scenario, animation sequences are rendered to create clips of fixed content, such as portions of a movie. In another scenario, the animation sequences are rendered in real time as part of an interactive application, such as a game.

A 3D model may be exported from a modeling tool and imported into an animation tool via a standard file format that defines a standard representation of a 3D model. The 3D model comprises a geometric description of an object and may include additional attributes, such as texture placement information. Similarly, an animation sequence may be exported from an animation tool and imported by a rendering tool. The animation sequence includes motion curves that define animated movement for the object. However, an animation rig that provides animation setup and behavior within one tool may not have an analogous representation in another tool. As a result, certain animation information is lost when transporting a model or animation sequence from one application to another application. Such loss is unavoidable in the standard representation regime because new modeling features may be advantageously added to one application, but not another application.

As the foregoing illustrates, there is a need in the art for an improved technique for transporting an animation setup from one application to another.

SUMMARY

One embodiment of the invention provides a computer-implemented method for generating a behavioral component of an animation asset that is stored for future execution. The method includes attaining the animation asset including the behavior component; generating an executable representation corresponding to the behavioral component based on a virtual machine (VM) instruction set architecture (ISA); generating a transport file comprising the executable representation and a geometric object that is configured to be animated when the executable representation is executed; and saving the transport file in a storage system.

Another embodiment of the invention provides a computer-implemented method for reproducing a behavioral component of an animation asset. The method includes loading virtual machine instructions comprising an executable representation from a transport file into a memory for execution by a runtime engine; loading geometric object data from the transport file into the memory for manipulation when the executable representation is executed; and executing the executable representation to manipulate the geometric data.

One advantage of embodiments of the invention is that highly customized behaviors may be transported as animation assets between different execution platforms via a common virtual machine execution model. Embodiments of the present invention enable users to advantageously transport behavior as well as geometric construction between tools and playback platforms. This contrasts with prior art solutions, which typically only provide for transport of geometric information or very basic behaviors.

DETAILED DESCRIPTION

The details set forth below enable a person skilled in the art to implement the embodiments of the invention described herein. Certain details tied to a specific implementation are omitted for clarity.

System Architecture

Figure 1:
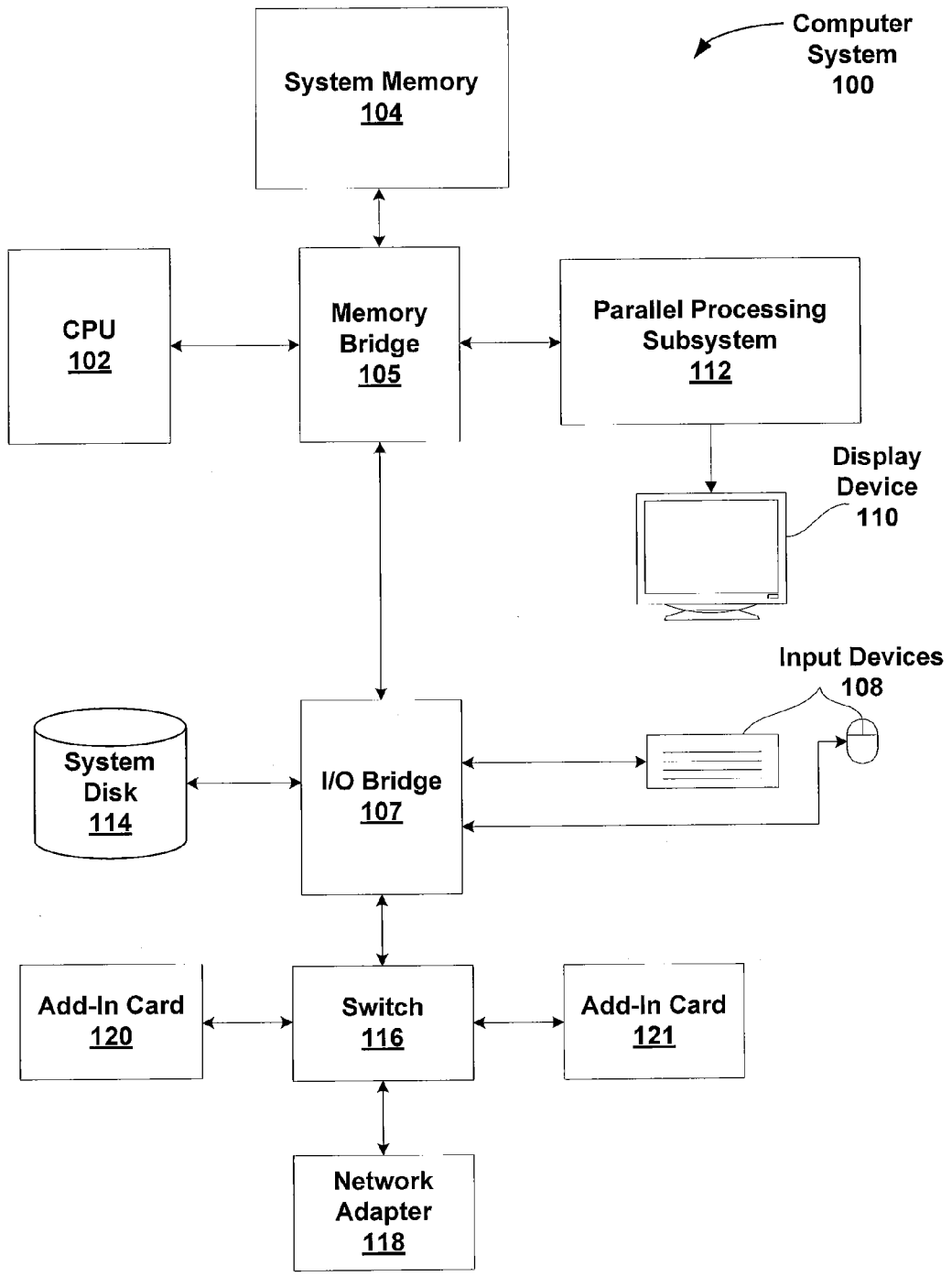
FIG. 1 is a block diagram of a computer system configured to implement one or more aspects of the present invention.

FIG. 1 is a block diagram of a computer system 100 configured to implement one or more aspects of the present invention. The system architecture depicted in FIG. 1 in no way limits or is intended to limit the scope of the present invention. Computer system 100 may be a computer workstation, personal computer, video game console, personal digital assistant, rendering engine, or any other device suitable for practicing one or more embodiments of the present invention.

As shown, computer system 100 includes a central processing unit (CPU) 102 and a system memory 104 communicating via a bus path that may include a memory bridge 105. CPU 102 includes one or more processing cores, and, in operation, CPU 102 is the master processor of computer system 100, controlling and coordinating operations of other system components. System memory 104 stores software applications and data for use by CPU 102. CPU 102 runs software applications and optionally an operating system. Memory bridge 105, which may be, for example, a Northbridge chip, is connected via a bus or other communication path (e.g., a HyperTransport link) to an I/O (input/output) bridge 107. I/O bridge 107, which may be, for example, a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105. In some embodiments, input/output devices may include a radio frequency identification (RFID) tag and/or RFID reader. Additionally, any other technically feasible technique for implementing user identification is within the scope of embodiments of the invention.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images, on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computer system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computer system 100, via network adapter 118 or system disk 114. The render farm generates one or more rendered images of the scene using the provided instructions and/or data. These rendered images may be stored on computer-readable media in a digital format and optionally returned to computer system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In one embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2A:
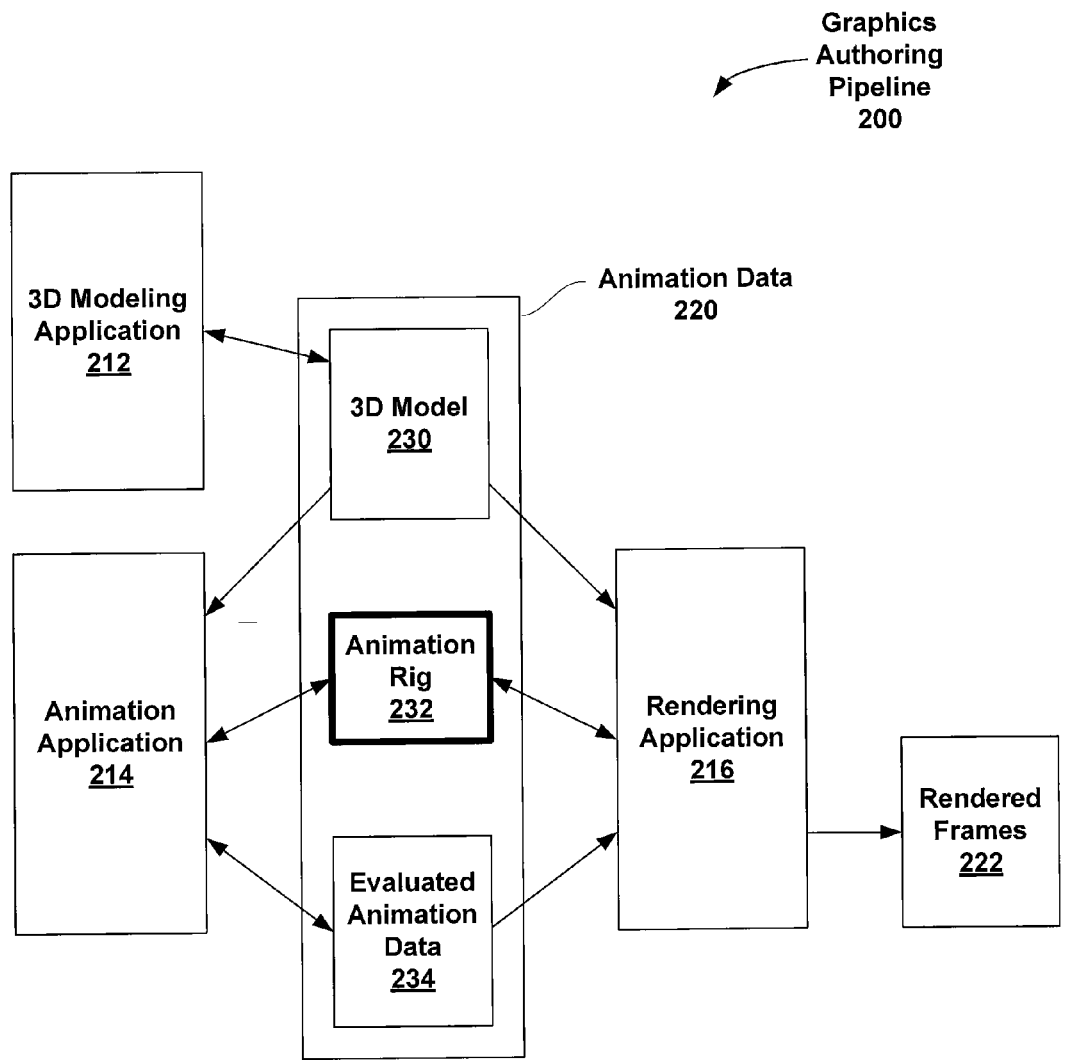
FIG. 2A illustrates a graphics authoring pipeline, according to one embodiment of the present invention.

FIG. 2A illustrates a graphics authoring pipeline 200, according to one embodiment of the present invention. The graphics authoring pipeline 200 includes a 3D modeling application 212, an animation application 214, and a rendering application 216. In one embodiment, the modeling application 212, animation application 214, and rendering application 216 are separate software applications. In alternative embodiments, an application suite may combine the functions of two or more of the applications 212, 214, 216. Users may author graphics content using one or more different 3D modeling applications, animation applications, or rendering applications based on specific technical requirements.

The 3D modeling application 212 enables a user to form a geometric model representing a desired 3D object. For example, the user may use the 3D modeling application 212 to generate a geometric model of a teapot or a game character. Conventional geometric models comprise meshes of geometric primitives, such as triangles. The animation application 214 enables the user to describe motion for the 3D object. The animation application 214 generates function curves that describe motion of various geometric components of the 3D model. Many common 3D objects exhibit complex behavior and the behavior is conventionally represented by an animation "rig." The rig imparts movement constraints, interdependences, and any other algorithmically determined movement properties for the 3D object. The rendering application 216 receives a sequence of discrete frames of scene information from a scene, with each frame comprising descriptions of plural 3D objects. The rendering application 216 renders each frame of scene information into a sequence of rendered frames 222 for storage or display. Persons skilled in the art will understand that specific functions of the 3D modeling application 212, animation application 214, and rendering application 216 may be implemented using any technically feasible technique.

Animation data 220 may comprise a 3D model 230, an animation rig 232, and evaluated animation data 234. The 3D model includes geometric primitives that collectively describe a 3D object. The animation rig 232 includes a behavioral description of the 3D model 230. Evaluated animation data 234 includes evaluated animation sequence data for a specific motion sequences for the 3D model 230. For example, the 3D model 230 may describe a humanoid form comprising movable components, such as a head and limbs, eyes, and muscle forms. The animation rig 232 describes how the movable components move to simulate actions such as walking or laughing. The evaluated animation data 234 describes a specific walking or laughing sequence.

In prior art systems, only the 3D model 230 and evaluated animation data 234 are transportable between disparate systems. Thus, in prior art system, new or different animation sequences can not be generated from the animation rig 232 outside the original animation application 214 used to construct the animation rig 232. If a different animation application needs to be used, a new animation rig needs to be created first. Thus, prior art solutions present challenges when multiple different tools of similar function are brought together in the graphics authoring pipeline 200, or when an interactive application could benefit from the animation rig 232 for real time animation applications.

In embodiments of the present invention, the animation rig 232 includes a functional description of animation computations. The functional description may be described as a directed graph (DG), a directed acyclic graph (DAG), or any other technically feasible description. The functional description includes specific computational steps for transforming input parameters into output parameters. The computational steps can be described in terms of a graphical representation or a language representation, or any combination thereof. The computational steps are compiled into instructions for a virtual machine. Any technically feasible virtual machine may be used, and any sufficiently general set of virtual machine instructions may specify an instruction set architecture for the virtual machine. In one embodiment, each application configured to receive the animation rig 232 includes a runtime engine that is able to execute the virtual machine instructions associated with the animation rig. Importantly, a common virtual machine instruction set architecture is implemented in each runtime engine for identical execution and identical results. Persons skilled in the art will recognize that execution of virtual machine instructions may be performed using various different techniques. For example, execution may be performed by interpreting virtual machine instructions directly or by dynamically compiling the virtual machine instructions into executable native code modules.

Figure 2B:
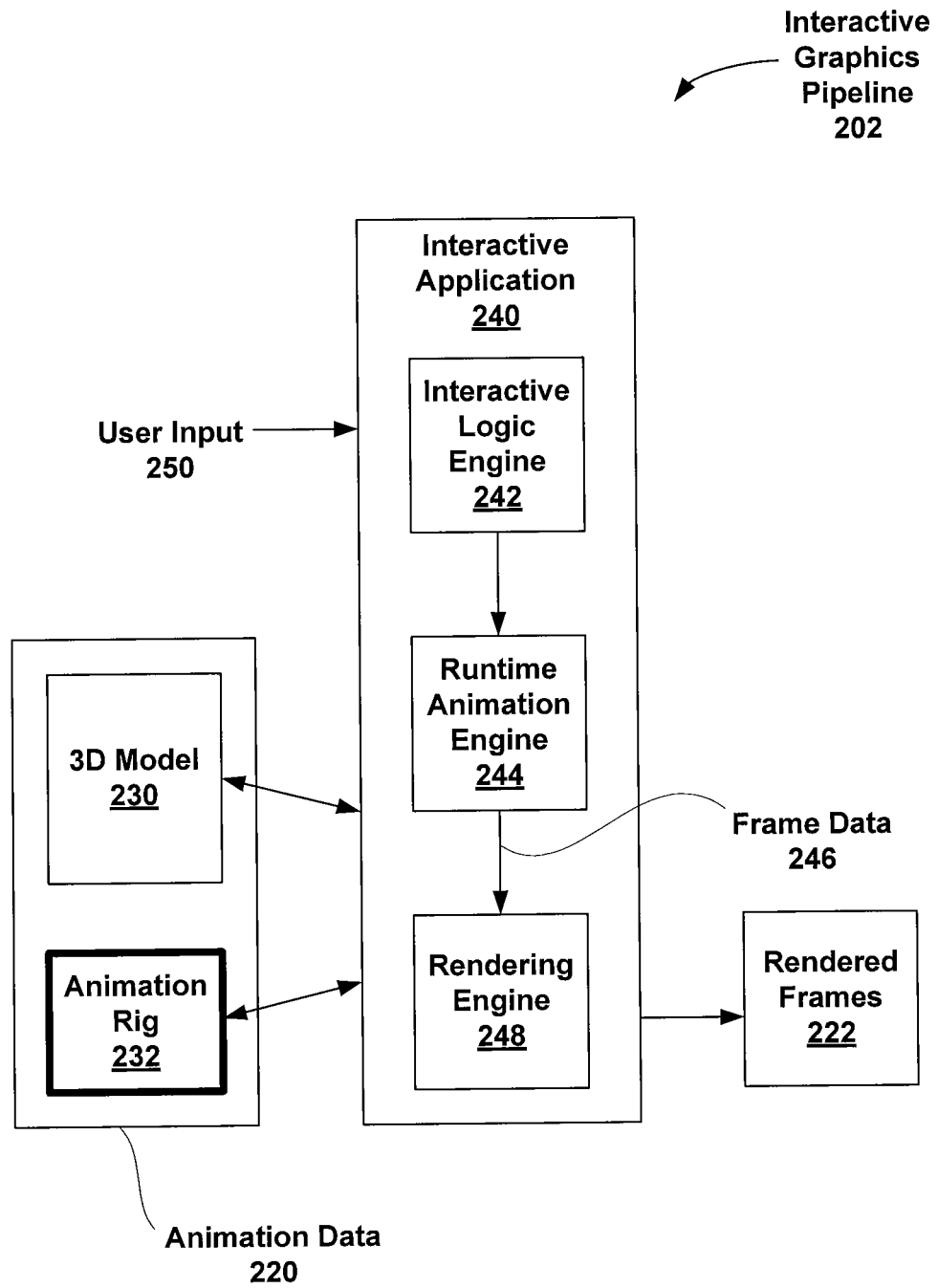
FIG. 2B illustrates an interactive graphics pipeline, according to one embodiment of the present invention.

FIG. 2B illustrates an interactive graphics pipeline 202, according to one embodiment of the present invention. The interactive graphics pipeline 202 is characterized by an interactive application 240 that receives animation data 220 and user input 250, and generates rendered frames 222. The interactive application 240 includes an interactive logic engine 242, a runtime animation engine 244, and a rendering engine 248. The interactive logic engine 242 defines the user experience for the interactive application 240. One example of the interactive logic engine 242 is a game engine. The game engine defines a setting for a game, and game play for the game. Persons skilled in the art will recognize that other types of interactive logic engines may be implemented without departing the scope of the present invention.

The runtime animation engine 244 generates frame data 246 comprising sequential frames of geometric objects being animated. Descriptions of the geometric objects may reside in the animation data 220. For example, 3D model 230 may be animated according to the animation rig 232 for creating sequential frames comprising frame data 246. The rendering engine 248 renders the frame data 246 to generate a corresponding sequence of images represented by the rendered frames 222.

The animation data 220, comprising the 3D model 230 and animation rig 232, may be created using the graphics authoring pipeline 200 and transported to the interactive graphics pipeline 202 without loss of information and without introducing computational discrepancies within the animation rig 232.

Figure 3A:
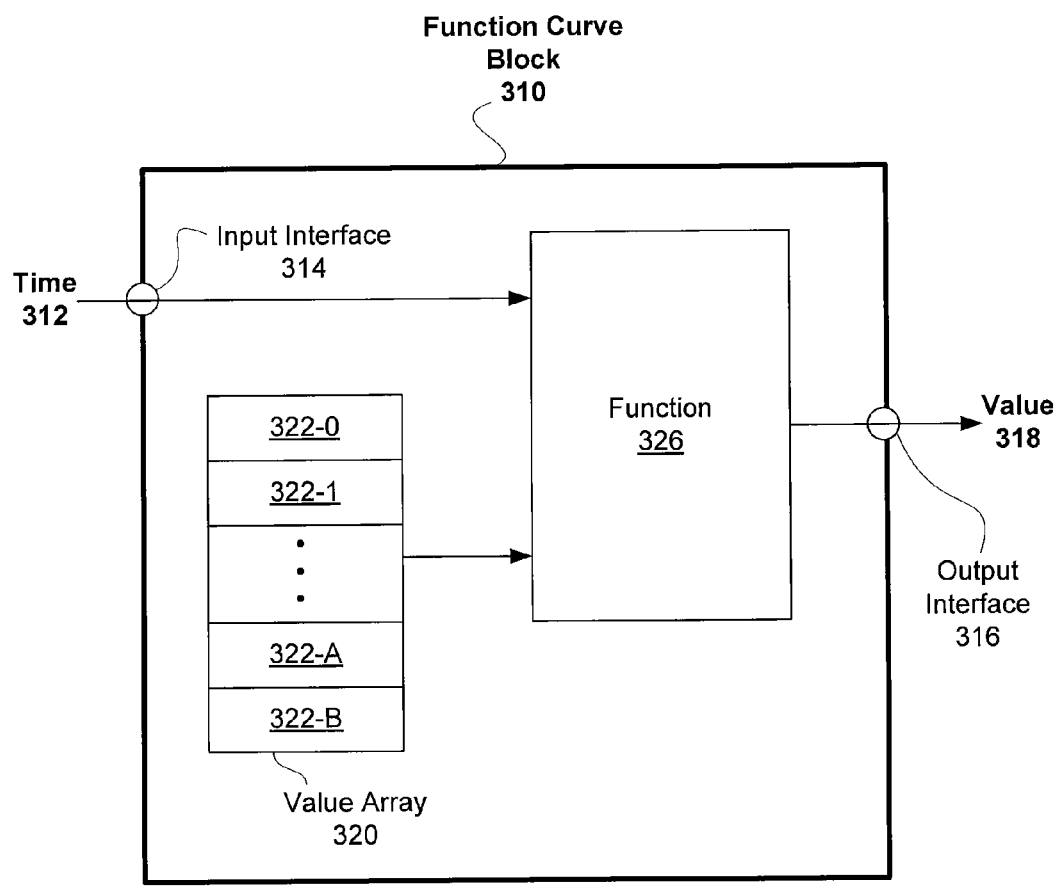
FIG. 3A illustrates a function curve block, according to one embodiment of the present invention.

FIG. 3A illustrates a function curve block 310, according to one embodiment of the present invention. The function curve block 310 includes an arbitrary function 326, a value array 320, a time input 312, and a value output 318. The time input 312 is received via input interface 314 (represented by a circle), and the value output 318 is transmitted via output interface 316 (also represented by a circle).

The functional curve block 310 generates the value output 318 based on the function 326 and data within value array 320, comprises data values 322. In one embodiment the function 326 is a cubic evaluation function and value array 320 stores coefficients as data values 322 for the cubic evaluation function. The value output 318 is a function of time input 312, and represents one of potentially plural parameters that describe animation for a 3D object.

Figure 3B:
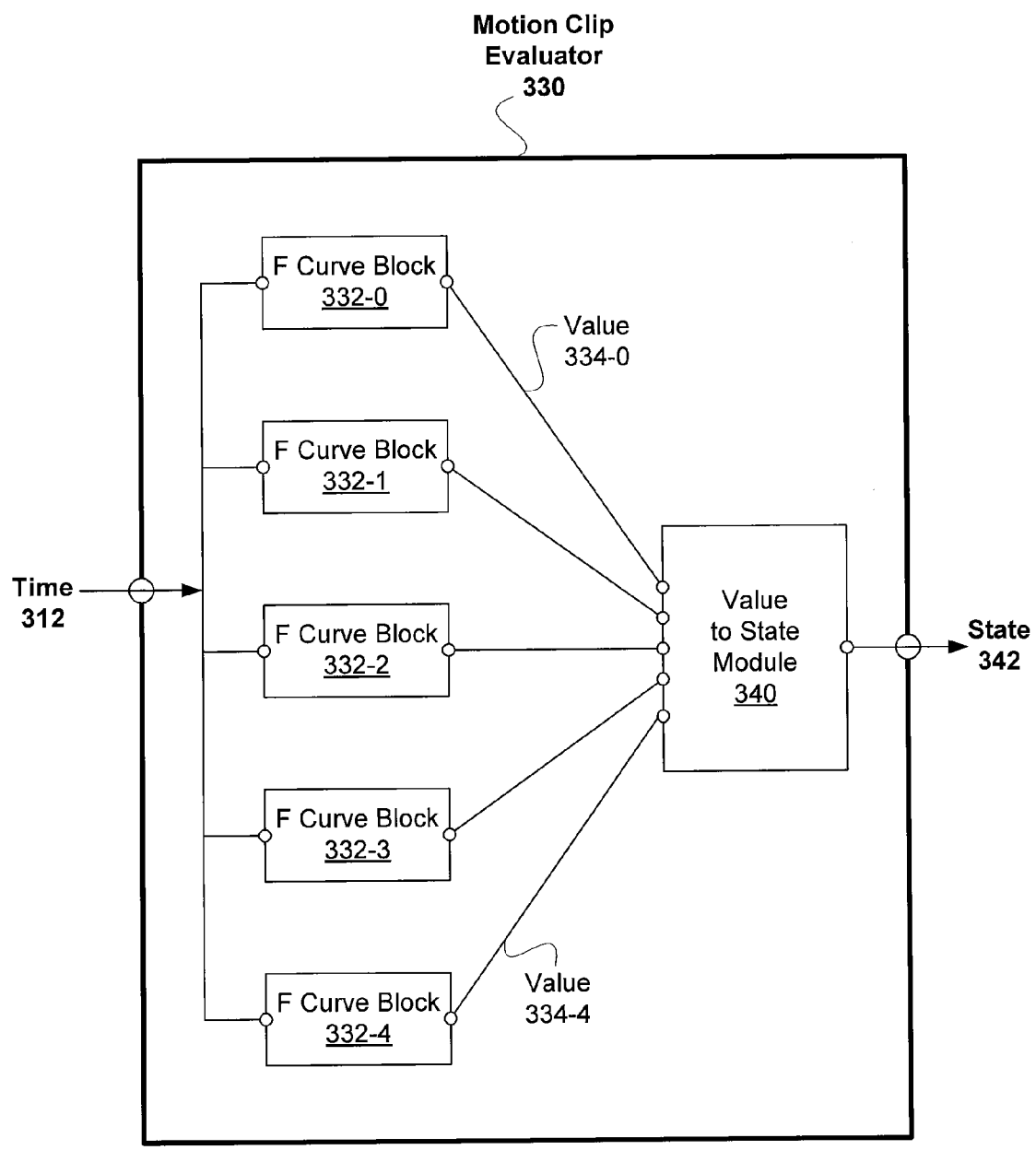
FIG. 3B illustrates an exemplary motion clip evaluator, according to one embodiment of the present invention.

FIG. 3B illustrates an exemplary motion clip evaluator 330, according to one embodiment of the present invention. The motion clip evaluator 330 may include plural function curve blocks 332, each substantially reflecting the structure and operation of functional curve block 310. Each function curve block 332 receives time input 312 and generates a respective value output 334. A value to state module 340 generates detailed state information for a related 3D object. The state information may include, without limitation, specific geometric position information for a given frame of animation for the 3D object. The state information is reflected in state output 342. In this way, the motion clip evaluator 330 generates a sequence of geometric state information presented as state output 342 as a function of time input 312.

Figure 3C:
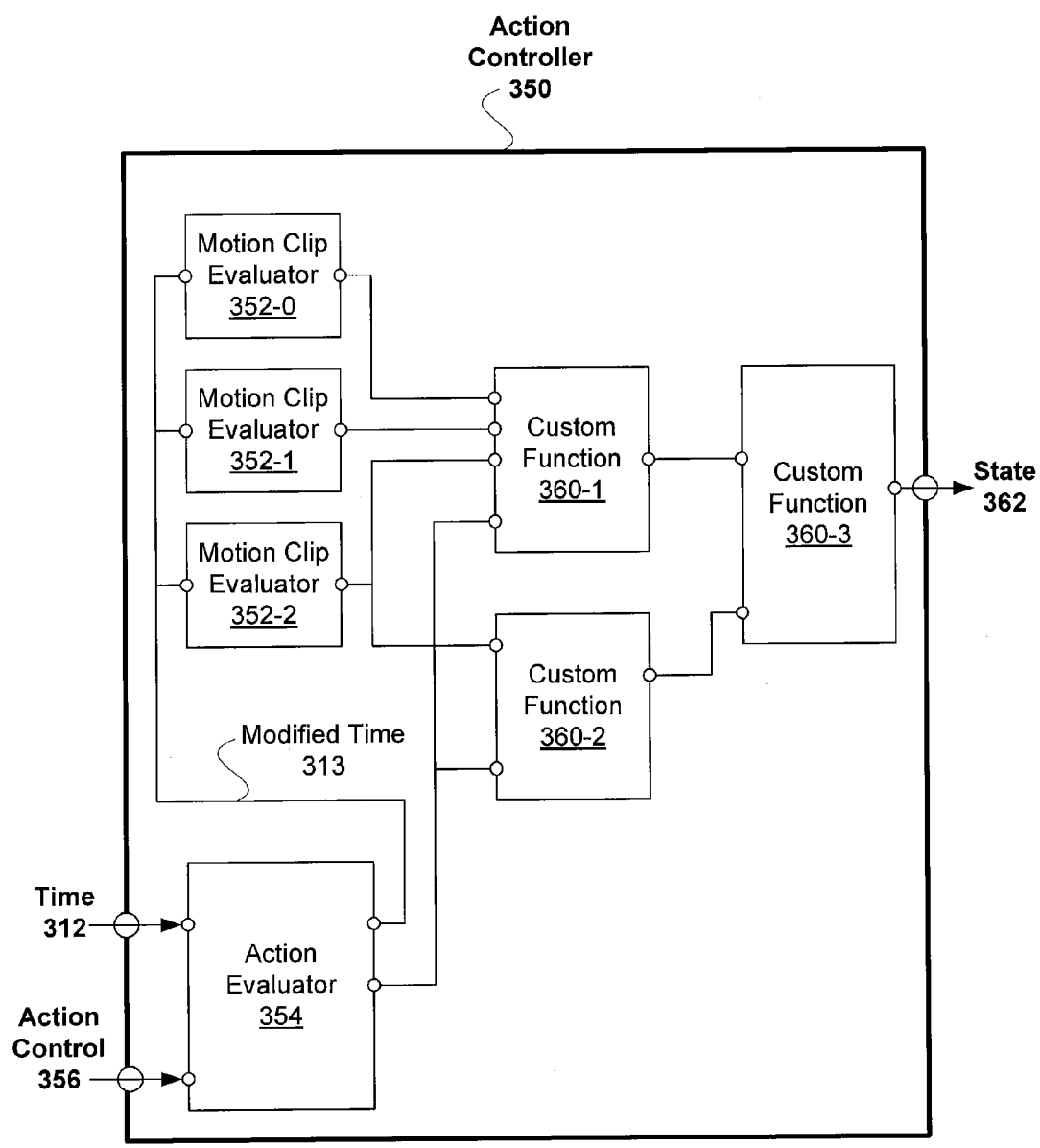
FIG. 3C illustrates an exemplary action controller, according to one embodiment of the present invention.

FIG. 3C illustrates an exemplary action controller 350, according to one embodiment of the present invention. The action controller 350 includes motion clip evaluators 352, custom functions 360, and action evaluator 354. Each motion clip evaluator 352 is configured to generate a specific aspect of geometric state information in response to a value of modified time 313. Each custom function 360 receives state information and performs a respective set of one or more operations on the state information to generate further state information. Custom function 360-3 generates output state 362. Action evaluator 354 receives time input 312 and generates modified time 313, used as inputs to the motion clip evaluators 352. Action evaluator 354 also receives action control information 356, which specifies specific actions related to the action evaluator 354. One example of an action controller generates a 3D object reflecting a humanoid performing a specified action, such as walking. The time input 312 determines what stage of walking, for example, the humanoid 3D object represents. The action control 356 may control what type of walking gate or style is reflected in an overall animation sequence of walking.

The action controller 350 and computational elements within the action controller 350, such as motion clip evaluator 330 and function curve block 310, may be incorporated into animation rig 232. In one embodiment, the computational elements may be represented and computed via compiled virtual machine code. Importantly, the animation rig, which specifies behavior for a 3D object, may be transported to another application or even another target platform via the compiled virtual machine code.

Figure 4:
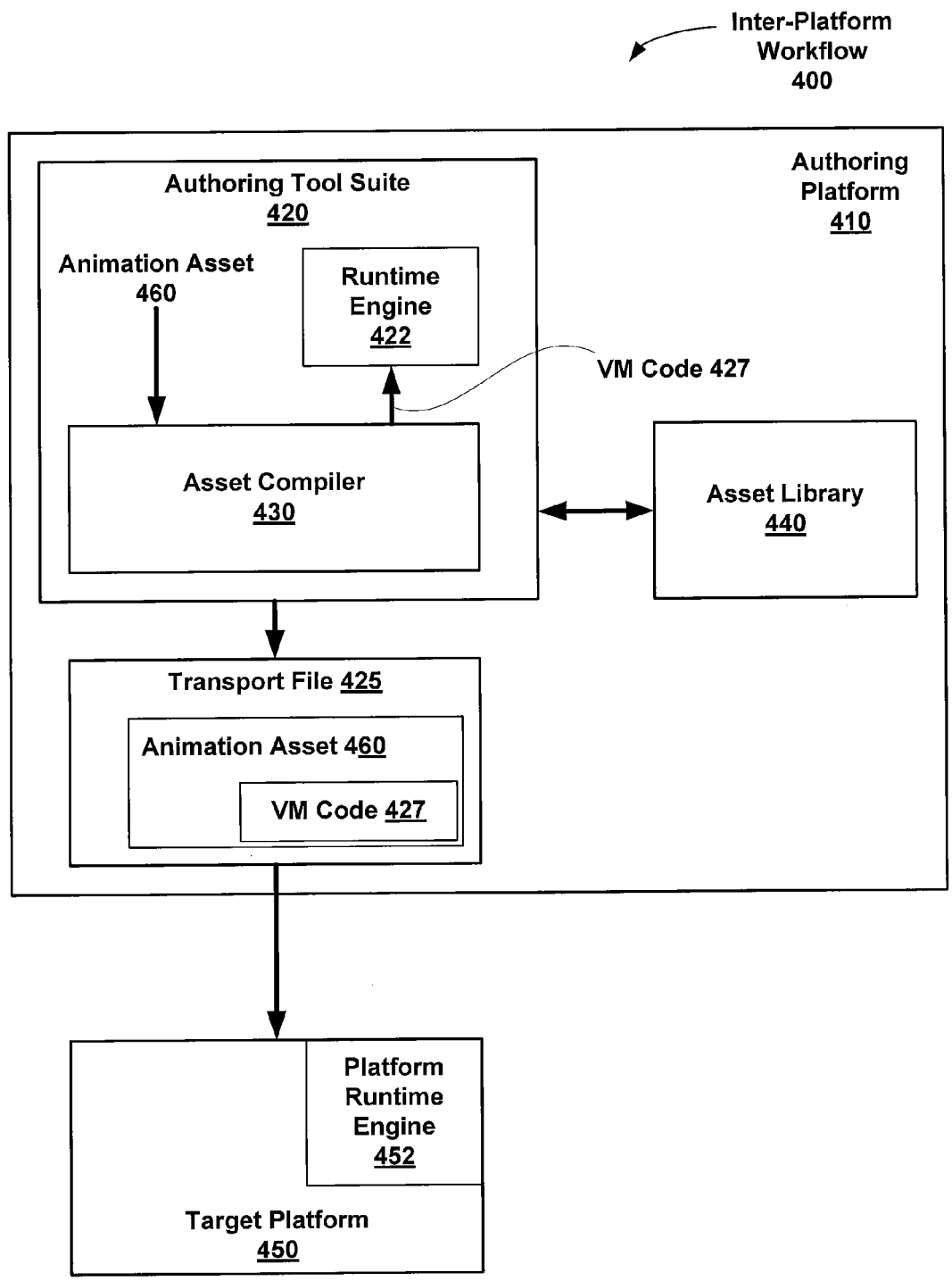
FIG. 4 illustrates an inter-platform workflow for transporting animation assets from an authoring platform to a target platform, according to one embodiment of the present invention.

FIG. 4 illustrates an inter-platform workflow 400 for transporting animation assets from an authoring platform to a target platform, according to one embodiment of the present invention. An animation asset may include, for example, a 3D object and one or more related animation rigs. Authoring platform 410 may comprise a computer system, such as computer system 100 of FIG. 1, configured to run an authoring tool suite 420. The authoring tool suite 420 may include 3D modeling application 212 of FIG. 2A, animation application 214, and rendering application 216, or any technically feasible combination thereof. The authoring tool suite 420 is typically required to perform exemplary animation sequences, and may invoke computational elements, such as those illustrated in FIGS. 3A-3C during normal authoring activities. Runtime engine 422 is configured to perform computations associated with the computational elements via compiled virtual machine code, generated by an asset compiler 430. Animation assets may be stored within asset library 440, residing in system disk 114, system memory 104, a network attached storage system (not shown), or any combination thereof.

In one embodiment, authoring tool suite 420 is used to create a particular animation asset 460, comprising a 3D object and an animation rig. The animation asset 460 may be stored within the asset library 440. After the animation asset 460 is created on the authoring platform 410, the animation asset 460 is transported to a target platform 450. Virtual machine code 427 associated with the animation asset 460 is executed in a platform runtime engine 452 residing within the target platform 450. The target platform 450 may be a game system or another computer system. Behavior associated with the animation asset 460 is transported as virtual machine instructions that may be executed identically on both the authoring platform 410 and the target platform 450.

The runtime engine 422 and platform runtime engine 452 may be developed from different source platforms, including Autodesk® Maya®, Autodesk® 3ds Max®, Autodesk® MotionBuilder®, or any other animation, authoring, and/or rendering tool.

Using conventional techniques, a scene description comprising animation assets associated with one platform cannot be easily converted into a scene description associated with a different platform (i.e., the target platform). In the prior art, the target platform may attempt to determine if solvers (i.e., functions) associated with the target platform are analogous to solvers in the scene description that are associated with the source platform. If no match is found, then the target platform chooses the "closest" solver, which may result in an awkward-looking representation. In some prior art systems, the scene description associated with a source platform is "baked" into a format that can be read by the target platform. Baking is a term commonly used to refer to the process of evaluating, at each frame of an animation, the values of the various parameters of the solvers in the source platform and exporting the results to a conventional (e.g., image) format. However, when the scene description is baked, all control of the parameters is lost and cannot be edited in the target platform. Embodiments of the invention solve these problems.

Embodiments of the invention differ significantly from prior art approaches in that they do not require the scene description associated with the source platform to "fit" into a "standard representation," as described above. Because a separate intermediate solver can be implemented for each node in the scene description in each different authoring (source) platform, embodiments of the invention provide for substantially the same evaluation of the scene description in any supported target platform, independent of the source platform. Each target platform (e.g., authoring tool, game engine, etc.) is implemented with a virtual machine that is able to understand and evaluate the code that is transported.

In some embodiments, the software application is able to create a list of tasks that can be evaluated in parallel and distribute the work to a multi-core parallel processor. Also, in some embodiments, the code generated can be multithreaded, parallelized, or distributed on multi-cores. In certain embodiments, the virtual machine optimizes task scheduling to take full advantage of multi-core architecture. A micro evaluation kernel may serve as a runtime engine to evaluate the virtual instructions on the target platform. In some embodiments, there is at least one different implementation of a runtime engine per target platform.

Accordingly, a scene description in a given target platform is evaluated to substantially the same result as the scene description in the source platform. This approach allows developers to work together more easily across various platforms. Also, in animation, since results of evaluating a scene description in the source and target platforms are the same, consistency is achieved between platforms.

Figure 5:
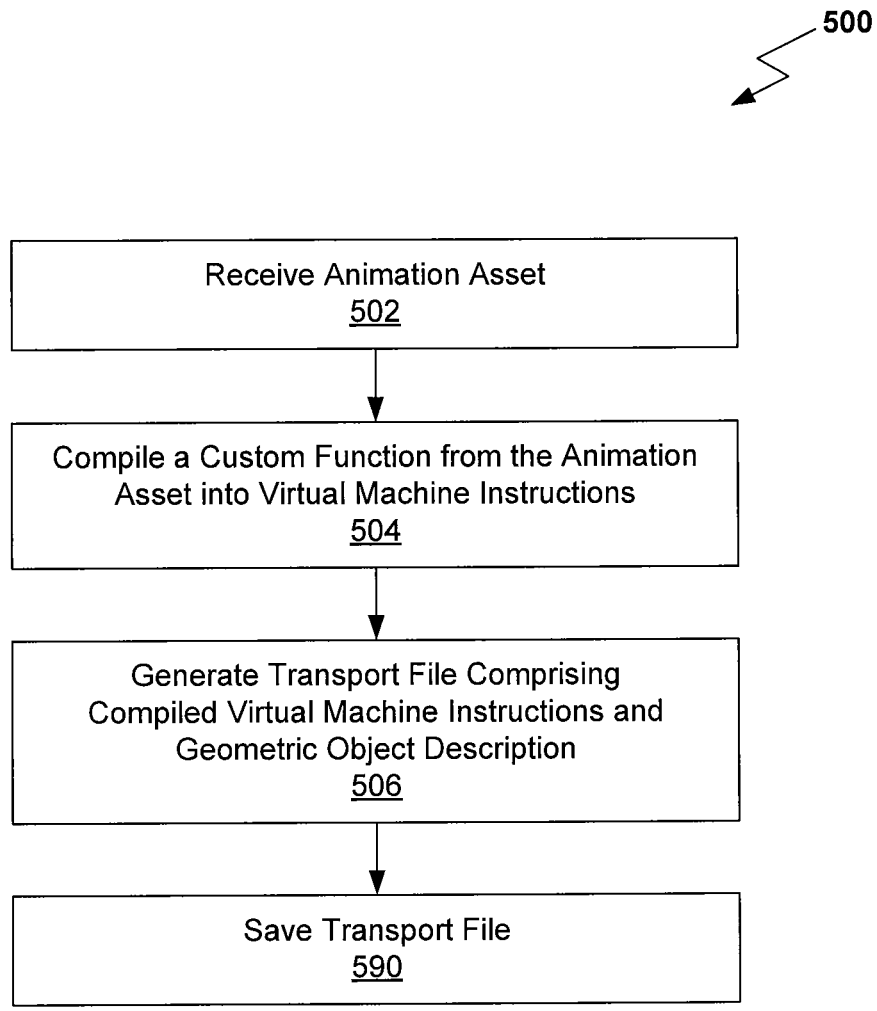
FIG. 5 is a flow diagram of method steps for generating a transport file, according to one embodiment of the present invention.

FIG. 5 is a flow diagram of method steps 500 for generating a transport file, according to one embodiment of the present invention. Although the method steps are described in conjunction with the systems of FIGS. 1-4, persons skilled in the art will understand that any system configured to perform the method steps, in any order, is within the scope of the invention.

The method begins is step 502, where asset compiler 430 of FIG. 4 receives a scene description including an animation asset comprising a geometric object and custom function for manipulating the geometric object. In step 504, the asset compiler 430 compiles a custom function from the animation asset into virtual machine instructions. In step 506, the asset compiler 430 generates transport file 425 comprising compiled virtual machine instructions (code) 427 for the custom function and a description of the geometric object. The method terminates in step 590, where the asset compiler 430 saves the transport file 590 to non-volatile storage, such as system disk 114 of FIG. 1.

Figure 6:
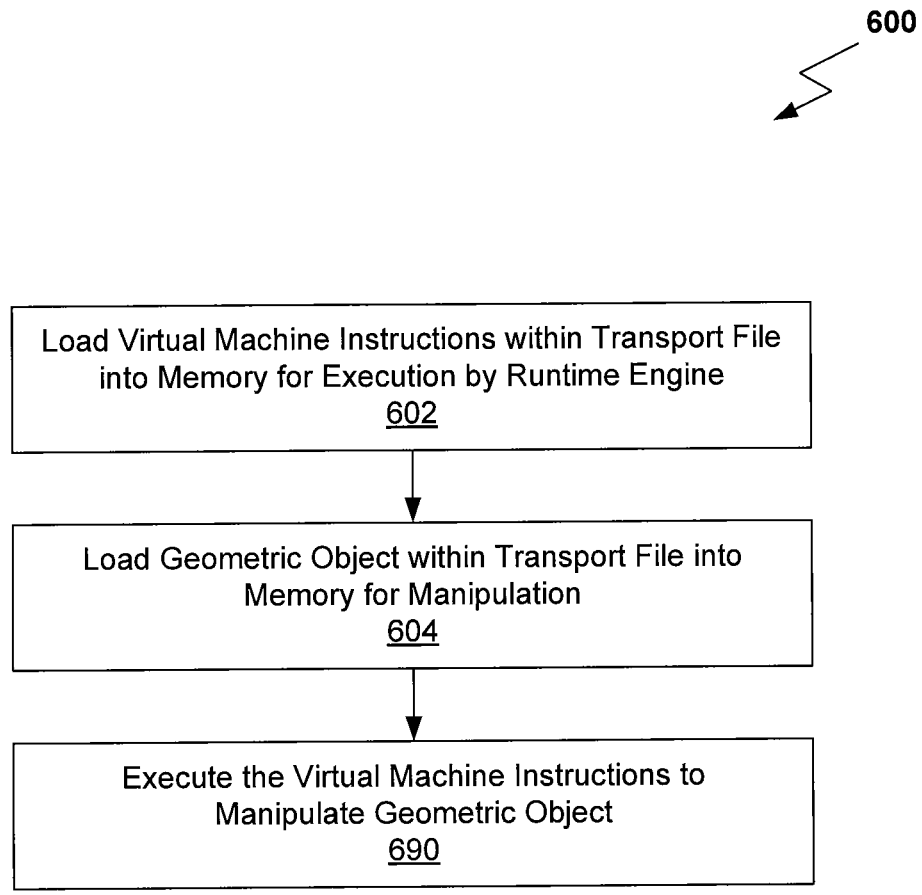
FIG. 6 is a flow diagram of method steps for manipulating a geometric object described within the transport file according to virtual machine instructions residing within the transport file, according to one embodiment of the present invention.

FIG. 6 is a flow diagram of method steps 600 for manipulating a geometric object described within the transport file according to virtual machine instructions residing within the transport file, according to one embodiment of the present invention. Although the method steps are described in conjunction with the systems of FIGS. 1-4, persons skilled in the art will understand that any system configured to perform the method steps, in any order, is within the scope of the invention.

The method begins in step 602, where target platform 450 loads virtual machine instructions 427 from transport file 425 into memory for execution by runtime engine 452. In step 604, target platform 450 loads geometric object data from transport file 425 into memory for manipulation. In step 490, the runtime engine 452 executes the virtual machine instructions 427 to manipulate the geometric object. The method terminates in step 490.

One advantage of the present invention is that highly customized behaviors may be transported as animation assets between different execution platforms via a common virtual machine execution model. Embodiments of the present invention enable users to advantageously transport behavior as well as geometric construction between tools and playback platforms. This contrasts with prior art solutions, which typically only provide for transport of geometric information or very basic behaviors.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for reproducing a behavioral component of an animation asset, the method comprising:
    loading virtual machine instructions comprising an executable representation that includes an animation rig from a transport file into a memory for execution by a first runtime engine, wherein the animation rig describes how movable components included in geometric object data move to simulate actions and includes a function curve block configured to generate state information of the geometric object data based on an evaluation function and a value array that stores coefficients for the evaluation function;
    loading the geometric object data from the transport file into the memory for manipulation when the executable representation is executed; and
    executing the executable representation to manipulate the geometric object data.

2. The method of claim 1, wherein the first runtime engine comprises a virtual machine (VM) configured to execute the virtual machine instructions.

3. The method of claim 1, wherein the first runtime engine resides in a first platform, and the transport file is generated by a second platform.

4. The method of claim 3, wherein the first platform comprises a gaming console.

5. The method of claim 1, wherein the transport file is generated by a first platform, and the first runtime engine resides in the first platform.

6. The method of claim 1, wherein the animation rig comprises a directed graph of computations.

7. The method of claim 1, wherein the first runtime engine resides in a first platform that is distinct from a second platform that generated the transport file, and the first runtime engine and a second runtime engine residing within the second platform are developed from different source platforms.

8. A non-transitory computer-readable medium storing instructions that, when executed by a processor, cause a computer system to reproduce a behavioral component of an animation asset, by performing the steps of:

loading virtual machine instructions comprising an executable representation that includes an animation rig from a transport file into a memory for execution by a first runtime engine, wherein the animation rig describes how movable components included in geometric object data move to simulate actions and includes a function curve block configured to generate state information of the geometric object data based on an evaluation function and a value array that stores coefficients for the evaluation function;

loading the geometric object data from the transport file into the memory for manipulation when the executable representation is executed; and executing the executable representation to manipulate the geometric object data.

9. The non-transitory computer-readable medium of claim 8, wherein the first runtime engine comprises a virtual machine (VM) configured to execute the virtual machine instructions.

10. The non-transitory computer-readable medium of claim 8, wherein the first runtime engine resides in a first platform, and the transport file is generated by a second platform.

11. The non-transitory computer-readable medium of claim 10, wherein the first platform comprises a gaming console.

12. The non-transitory computer-readable medium of claim 8, wherein the transport file is generated by a first platform, and the first runtime engine resides in the first platform.

13. The non-transitory computer-readable medium of claim 8, wherein the animation rig comprises a directed graph of computations.

14. A computer system, comprising:

a processor; and a memory storing instructions that, when executed by the processor, cause the computer system to reproduce a behavioral component of an animation asset by:

loading virtual machine instructions comprising an executable representation that includes an animation rig from a transport file into a memory for execution by a first runtime engine, wherein the animation rig describes how movable components included in geometric object data move to simulate actions and includes a function curve block configured to generate state information of the geometric object data based on an evaluation function and a value array that stores coefficients for the evaluation function, loading the geometric object data from the transport file into the memory for manipulation when the executable representation is executed, and executing the executable representation to manipulate the geometric object data.

15. The computer system of claim 14, wherein the first runtime engine comprises a virtual machine (VM) configured to execute the virtual machine instructions.

16. The computer system of claim 14, wherein the first runtime engine resides in a first platform, and the transport file is generated by a second platform.

17. The computer system of claim 16, wherein the first platform comprises a gaming console.

18. The computer system of claim 14, wherein the transport file is generated by a first platform, and the first runtime engine resides in the first platform.

19. The computer system of claim 14, wherein the animation rig comprises a directed graph of computations.

20. A computer-implemented method for reproducing a behavioral component of an animation asset, the method comprising:

loading virtual machine instructions comprising an executable representation that includes an animation rig from a transport file into a memory for execution by a first runtime engine, wherein the animation rig describes how movable components included in geometric object data move to simulate actions and includes a function curve block configured to generate state information of the geometric object data based on a cubic evaluation function;

loading the geometric object data from the transport file into the memory for manipulation when the executable representation is executed; and executing the executable representation to manipulate the geometric object data.

21. The method of claim 20, wherein the animation rig further includes a value array that stores coefficients for the cubic evaluation function.

\* \* \* \* \*